US012716516B2

(12) United States Patent
McBrien et al.

(10) Patent No.: US 12,716,516 B2
(45) Date of Patent: Aug. 25, 2026

(54) VARIABLE DITHER CONTROL SYSTEM FOR A FLUID ACTUATOR

(71) Applicant: Hamilton Sundstrand Corporation, Charlotte, NC (US)

(72) Inventors: Gary M. McBrien, South Glastonbury, CT (US); James Saloio, Ludlow, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1559 days.

(21) Appl. No.: 16/028,681

(22) Filed: Jul. 6, 2018

(65) Prior Publication Data

US 2020/0011447 A1 Jan. 9, 2020

(51) Int. Cl.
*F16K 31/06* (2006.01)
*F15B 9/07* (2006.01)
*F15B 13/043* (2006.01)

(52) U.S. Cl.
CPC ............ *F16K 31/0675* (2013.01); *F15B 9/07* (2013.01); *F15B 13/0438* (2013.01)

(58) Field of Classification Search
None
See application file for complete search history.

(56) References Cited

U.S. PATENT DOCUMENTS 4,007,361 A * 2/1977 Martin ..................... F15B 9/03 318/561
4,510,848 A 4/1985 Kast
4,538,644 A 9/1985 Knutson et al.
4,757,747 A 7/1988 Blatter et al.
5,012,722 A 5/1991 McCormick
6,170,525 B1 1/2001 Takats et al.
6,938,592 B2 * 9/2005 Taylor ..................... F01L 1/022 123/694
7,000,392 B2 * 2/2006 Greentree .............. F02B 37/24 123/559.1
7,260,462 B2 * 8/2007 Keim ................... F15B 21/082 137/625
8,226,359 B1 * 7/2012 Jansen ................... F01D 17/16 415/160
8,786,138 B2 * 7/2014 Carter ................... G05B 19/33 307/116
9,523,376 B2 12/2016 Derkx et al.
2004/0225429 A1 11/2004 Keim et al.
2016/0299512 A1 10/2016 Summers et al.
2018/0153101 A1 6/2018 Dunn et al.

OTHER PUBLICATIONS

European Search Report for EP Application No. 19184671.6 dated Sep. 25, 2019.

* cited by examiner

*Primary Examiner* — Michael Quandt
(74) *Attorney, Agent, or Firm* — Carlson, Gaskey & Olds, P.C.

(57) ABSTRACT

A fluid system has a fluid actuator that receives a fluid to cause movement of a component. A valve selectively controls the flow of fluid to the fluid actuator. A motor for the valve is provided with an electric voltage or current. A control applies a pulse width modulation variation to the supplied voltage or current. The control is operable to vary the pulse width modulation of the voltage or the current based upon conditions of the system. A mechanical system and a method are also disclosed.

13 Claims, 1 Drawing Sheet

VARIABLE DITHER CONTROL SYSTEM FOR A FLUID ACTUATOR

BACKGROUND

This application relates to a control system that provides a variable dither to a voltage or current command to a fluid actuator.

Fluid actuators are known in many modern applications. As one example, a piston may be driven with hydraulic fluid to change the position or orientation of a mechanical component. Also, fluid actuators may be utilized to drive fluid systems such as hydraulic motors.

With modern controls, careful positioning of the actuator becomes desirable. There is a challenge with many modern systems due to an effect known as hysteresis effects. In particular, magnetic systems exhibit a hysteresis characteristic which can cause the actual positioning of the component dynamic response to be different from that which is desired.

There is also mechanical hysteresis which can be present in actuator systems. As an example, the movement of a hydraulic piston, such as one with seals that cause mechanical resistance can be impeded from moving to the desired or expected position.

It is known in prior art that providing "dither" by utilizing pulse width modulation (PWM) on a voltage or current supply or, by other means, to a motor or other drive for a fluid system, the performance of the system can be enhanced. A PWM supply rapidly perturbs applied current such that the fluid actuator components undergo small and repeated movements in opposed directions, usually about some operating point.

This can reduce the effect of the hysteresis. However, the use of the dither itself can raise some undesirable characteristics such as noise, wear, and unacceptable output disturbance.

SUMMARY

A fluid system has a fluid actuator that receives a fluid to cause movement of a component. A valve selectively controls the flow of fluid to the fluid actuator. A motor for the valve is provided with an electric voltage or current. A control applies a pulse width modulation variation to the supplied voltage or current. The control is operable to vary the pulse width modulation of the voltage or the current based upon conditions of the system. A mechanical system and a method are also disclosed.

These and other features may be best understood from the following drawings and specification.

DETAILED DESCRIPTION

Figure 1:
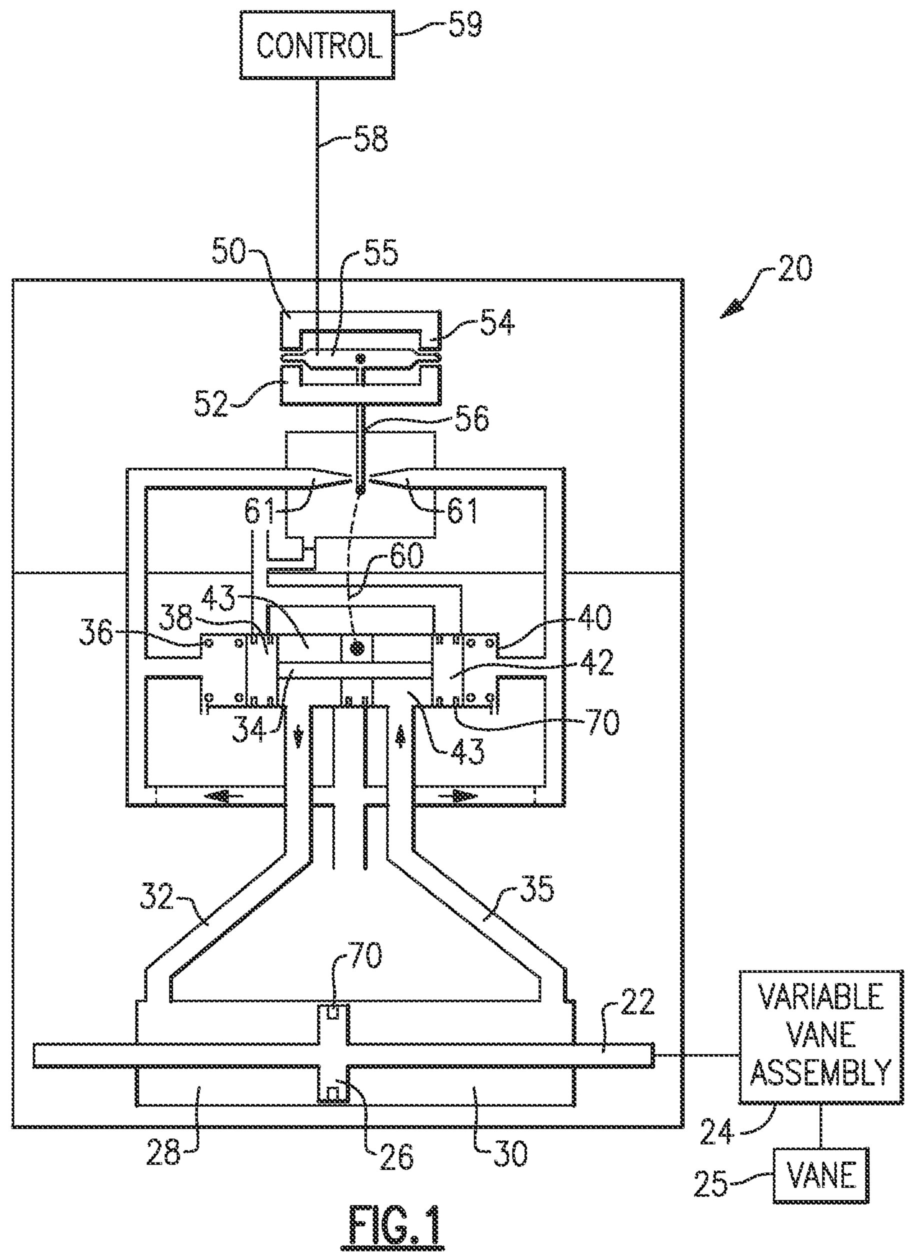
FIG. 1 schematically shows a first fluid system.

FIG. 1 shows an example fluid system 20. Fluid system 20 controls an actuator piston rod 22 which is connected to drive or position a component 24. Component 24 can be any number of mechanical components. In one specific embodiment, the component 24 may position a variable vane assembly on a gas turbine engine. As the piston rod 22 is driven to translate, it may drive a mechanism such as a synchronization ring and other interrelated components to, in turn, change the position of a variable vane, shown schematically at 25. The connections and reasons for changing the angular orientation of the variable vane 25 may be as known. However, a control system, as will be described, is unique to this disclosure.

The piston rod 22 drives with a piston 26, which is moved to translate by fluid driven into chambers 28 or 30. Supply/return lines 32/35 connect the chambers 28/30 to a spool valve 34. Spool valve 34 has springs 36 and 40 positioning lands 38 and 42. Fluid is driven into chambers 43 between the lands 42 and 38 to drive the spool valve and to selectively communicate return or supply lines to, in turn, drive the actuator 22.

A drive motor 50 incorporates magnets 52 and 54 to change an angular attraction/opposition for an armature winding 55. Winding 55 is supplied with current and voltage from a supply 58. Supply 58 is controlled by a control 59.

As the current and voltage are controlled to the two sides of the armature, an end effector 56 is caused to pivot between flapper nozzles 61. As the end effector 56 pivots, it either restricts or opens respective nozzles 61.

This, in turn, drives the position of the spool valve 34 to change. A feedback spring 60 connects the end effector to valve 34

The operation of the system as described to this point is generally as known. In addition, while the particular fluid system 20 is disclosed, the teachings of the control of this disclosure can extend to many other types of systems wherein a fluid actuator motor receives a control current and/or voltage to control a valve position.

As mentioned above, in the prior art, there is knowledge that there is hysteresis, particularly in the drive motor 50. However, within the spool valve 34, and even the actuator rod 22, there may also be mechanical hysteresis, such as may occur by movement along seals 70, or with regard to the reaction of the springs 36 and 40.

In the prior art, a voltage/current supply 59 was utilized with a suitably high frequency pulse width modulation mechanism to rapidly cycle the applied voltage on and off, resulting in the application of a steady current while minimizing heat and power dissipation in the controlling device.

Applicant has recognized that the use of the pulse width modulation control at a lower frequency, to effectively provide "dithering," or a repeated perturbation of the position about some operating point, has efficiency losses as to energy, and also may result in undesirable wear.

Figure 2:
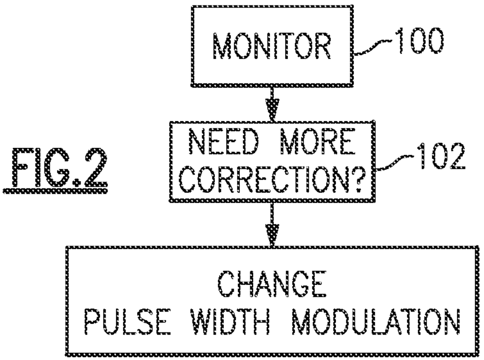
FIG. 2 shows a flowchart for a control feature of this disclosure.

Thus, as shown in the flowchart of FIG. 2, in a broad method of this disclosure, the control 59 monitors operation of the overall system 20 at step 100. The question is asked whether increased correction of the position is necessary. If so, then the frequency and/or the width of the pulses of a pulse width modulation control can be lowered, at the same time the applied voltage is increased or decreased. With the lowering of the frequency, the magnetic perturbations of the armature magnetic field, and the mechanical perturbations of the driven system, such as here, at the pivoting end of effector 56 will become more pronounced. This, in turn, can result in more pronounced movement of the spool valve 34 and the actuator rod 22. This will provide better elimination of the hysteresis effect and more accurate overall positioning. However, as mentioned above, there are undesirable losses due to use of the dithering, especially as the frequency is lowered. A combination of higher voltage with smaller pulse width or lower pulse width modulation frequency or some combination of the two will increase the perturbations and dither.

As such, in situations where the increased correction, or fine positioning, is not as necessary, the control will move the pulse width modulation to a higher frequency, reducing the magnetic and/or mechanical dither.

In one embodiment, there may be an infinite number of steps of variation in the pulse width modulation frequency and voltage control. Five such steps are disclosed below. However, more or fewer steps can also be utilized. In one example, at least three distinct levels are contemplated.

At a highest frequency level, and/or a lowest applied voltage and wide pulse width, there is the lowest ripple, the least noise, the least wear, and the most efficient use of power. Such a first step may be utilized when accurate positioning is not as necessary. Such as when gross movement is being achieved.

At a second step, the frequency is lowered somewhat from the first step, and/or the applied voltage is raised and pulse width is reduced. Such a step has a greater "ripple" or variation, and removes magnetic hysteresis effects such as from actuator 50. This is accomplished by having a perturbation in the magnetic field that exceeds the magnetic hysteresis band such that the commanded current results in a commanded magnetic field that oscillates around the hysteresis band in a manner known to reduce the effects of hysteresis in prior art.

A third step may have still higher voltage/more narrow pulse width, and/or lower frequency from the second step. The ripple is larger and would tend to remove the effect of magnetic hysteresis and also mechanical hysteresis at the spool valve 34, due to the dithering effect of the implied current.

At a still higher voltage/more narrow pulse width and/or a lower frequency, the ripple is becoming larger. The benefits as mentioned in three are all achieved, however, there also tends to provide mechanical dithering, thereby reducing friction and hysteresis in the actuator. As dynamic friction in a system, as would be experienced when the mechanical surfaces in contact are moving, is reduced compared to static friction when the the surfaces are not moving or moving very slowly, the hysteresis is reduced.

At step 5, an even lower frequency may be utilized. The dithering movement begins to be noticeable in the target system. Still, the target system will tend to oscillate about the desired position, and there is a reduction in frictional effect as described in the step above, due to the resulting lower dynamic friction rather than static friction.

In a modern control system, there are various times in the control operation when various aspects of performance are desired to be optimized in the system, variable with time, operating mode, output position or condition, etc. with this system, dither can be modulated instantaneously in real time, varying in duration and/or, amplitude, to suit the needs at that moment As examples, when the system output is moving rapidly, and fine positioning accuracy is not required, during gross movements from one position to another, the dither could be small. If a system has arrived close to a desired position the dither can be increased to allow the system to position very accurately, then when the system has arrived very close to the desired position, the dither can be reduced again. Likewise when the system output is at a point where greater positioning accuracy is not needed, the dither can be small.

A method of operating a fluid driven system includes the steps of operating a valve for selectively controlling a flow of fluid to a fluid actuator. The valve is provided with an electric voltage and current. A component is moved by the fluid actuator. A control applies pulse width modulation to the voltage or current. The control varies at least one of an applied voltage, pulse width or frequency of the pulse width modulation based upon conditions of the system.

A control programmed to achieve the above variation may be incorporated into a full-authority digital electronic control for an associated engine, or may be a separate control.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A fluid driven system comprising:

a fluid actuator to receive a fluid to result in movement of a component;

a valve for selectively controlling the flow of fluid to said fluid actuator, a control and a motor for said valve being provided with a voltage and an electric current;

said control for applying a pulse width modulation to said supplied voltage or current, and said control being operable to vary said pulse width modulation of the voltage or current; and said fluid actuator being moveable to change the position of the component, and said control determining an amount of movement of said component and varying a frequency of said pulse width modulation based upon the amount of movement, and such that said control increasing the frequency when the amount of movement is greater, and decreasing the frequency as the position of the component approaches a desired position.

2. The fluid driven system as set forth in claim 1, wherein the frequency of said pulse width modulation is varied across at least three levels.

3. The fluid driven system as set forth in claim 1, wherein said component is a variable vane for use in a gas turbine engine.

4. The fluid driven system as set forth in claim 3, wherein said fluid actuator is a reciprocating piston.

5. The fluid driven system as set forth in claim 1, wherein the motor includes an armature coil supplied by the current to, in turn, control a flow of fluid to the fluid actuator.

6. The fluid driven system as set forth in claim 1, wherein said motor controlling supply of fluid to said valve, said valve controlling the supply of fluid to said fluid actuator, with there being magnetic hysteresis at said motor, and mechanical hysteresis associated with both said valve and said fluid actuator, and said pulse width modulation reducing an effect of said magnetic hysteresis and said mechanical hysteresis of a positioning of said component.

7. The fluid driven system as set forth in claim 6, wherein a lowered frequency of pulse width modulation eliminates more of said magnetic and mechanical hysteresis than does a higher frequency.

8. The fluid driven system as set forth in claim 1, wherein said control operable to vary at least one of a duration, a width and a frequency of the pulse width modulation of the voltage or current.

9. A method of operating a fluid driven system comprising:

operating a motor for a valve to control a position of a fluid actuator, and said motor being provided with a voltage and a current;

and moving a component with said fluid actuator by applying pulse width modulation to said voltage or current, and varying said pulse width modulation of the current; and said fluid actuator being moveable to change the position of the component, and a control determining an amount of movement of said component and varying a frequency of said pulse width modulation based upon the amount of movement, and such that said control increasing the frequency when the amount of movement is greater, and decreasing the frequency as the position of the component approaches a desired position.

10. The method as set forth in claim 9, wherein a lowered frequency eliminates more of magnetic and mechanical hysteresis than does a higher frequency.

11. The method as set forth in claim 10, wherein said fluid actuator is a reciprocating piston.

12. The method as set forth in claim 9, wherein said component is a variable vane in a gas turbine engine.

13. The method as set forth in claim 9, wherein said control varying at least one of a duration, a width and a frequency of the pulse width modulation of the voltage or current.

* * * * *